United States Patent
Light et al.

(10) Patent No.: US 6,977,366 B2
(45) Date of Patent: *Dec. 20, 2005

(54) DETECTING AND THWARTING IMAGING SYSTEMS AT THEATRICAL PERFORMANCES

(76) Inventors: Elliott D. Light, 12 Bentana Way, Rockville, MD (US) 20850; Jon L. Roberts, 529 Clear Spring Rd., Great Falls, VA (US) 22066

( * ) Notice: Subject to any disclaimer, the term of this patent is extended or adjusted under 35 U.S.C. 154(b) by 0 days.

This patent is subject to a terminal disclaimer.

(21) Appl. No.: 10/816,970

(22) Filed: Apr. 2, 2004

(65) Prior Publication Data

US 2004/0182996 A1 Sep. 23, 2004

Related U.S. Application Data

(63) Continuation-in-part of application No. 10/294,273, filed on Nov. 14, 2002.

(51) Int. Cl.[7] .................................................. H01J 40/14
(52) U.S. Cl. ..................... 250/221; 250/208.2; 380/201; 386/94
(58) Field of Search .............................. 250/221, 208.2, 250/208.4; 352/38, 39; 380/201; 353/122, 90, 34; 386/94; 360/60; 348/744

(56) References Cited

U.S. PATENT DOCUMENTS 6,018,374 A * 1/2000 Wrobleski .................. 348/744
6,674,561 B2 * 1/2004 Ohnishi et al. .............. 359/238
6,742,901 B2 * 6/2004 Kimura et al. .............. 353/122
6,771,349 B2 * 8/2004 Sitrick et al. ................. 352/85
6,856,935 B1 * 2/2005 Fehlis et al. ................ 702/152
2004/0091110 A1 * 5/2004 Barkans ...................... 380/201

FOREIGN PATENT DOCUMENTS

| EP | 1 057 323 | 2/2002 |
|---|---|---|
| WO | WO 00/74366 | 12/2000 |

OTHER PUBLICATIONS

Gary Brown, "How Autofocus Cameras Work", Internet article, http://travel.howstuffworks.com/autofocus.htm.

* cited by examiner

*Primary Examiner*—David Porta
*Assistant Examiner*—Stephen Yam
(74) *Attorney, Agent, or Firm*—Roberts, Abokhair & Mardula, LLC

(57) ABSTRACT

A system and method of detecting and thwarting the use of unauthorized imaging systems at theatrical performances. Sensors are deployed at a theatrical event to detect the IR focusing signal and/or the RF signal of an unauthorized imaging device. De-focusing signals are used to disrupt the auto focus system of imaging devices that do not use IR focusing systems. A thwarting signal comprising invisible light frequencies may be combined to produce a thwarting signal that is received by the CCD of an imaging device as white light thereby rendering the recorded image unusable.

9 Claims, 1 Drawing Sheet

DETECTING AND THWARTING IMAGING SYSTEMS AT THEATRICAL PERFORMANCES

RELATIONSHIP TO OTHER APPLICATIONS

This application is a continuation in part of U.S. application Ser. No. 10/294,273, filed Nov. 14, 2002 which is hereby incorporated by reference for all purposes and from which priority is claimed.

BACKGROUND

The present invention relates generally to the field of entertainment. More specifically, the present invention is a system and method of detecting and thwarting the use of unauthorized imaging systems at theatrical performances.

Entertainment is a multibillion-dollar business. Movies, plays, and concerts represent investments that have both a time value and an intellectual property value. The time value of an entertainment asset is usually very high, but reflects the reality that over time the demand for an entertainment asset will decline as access to the asset increases or as competition from other entertainment assets increases. For example, a movie is most valuable when it is first released to theaters and the potential audience is exposed to advertising and hype about the movie. The movie declines in value over time as the audience has viewed the movie and as other movies are released.

Entertainment assets also have an intellectual property value. A movie, for example, that has completed its theater run has potential value as a video for sale or rental purposes. The movie is a copyrighted asset and that asset can be sold or licensed. Similarly, a live performance has its own copyright that is highly valuable and requires protection.

Increasingly, entertainment assets are subject to piracy. Theaters and other venues that admit patrons to movies, concerts, and plays forbid the motion picture filming, video recording or still photograph recording of performances. However, it is difficult to police such conditions of admission. Finding a video camera or other imaging system in a large, dark theater is a significant challenge. It is also the case that within days or even hours of the release of a new movie, pirated copies of varying quality are available for sale on the street. Such copies are frequently the result of an unscrupulous individual taking a video camera into the theater and simply filming or recording the movie. Copies can then be rapidly made in a "boiler room" environment and sold on the street. And this does not only apply to movies. Live concerts and performances are equally protected by the copyright laws and, unfortunately, are equally as vulnerable to this form of pirating. Additionally, a still camera can image a performer in concert even when such taking of pictures is prohibited. What is needed is a means of detecting, locating and/or thwarting the use of an imaging system that is being used to surreptitiously film a theatrical performance.

SUMMARY

An embodiment of the present invention is a system and method of detecting, locating and/or thwarting the use of an imaging system that is being used to surreptitiously film a theatrical event. For purposes of this application, the phrase "imaging system" is used to describe any still or movie camera whether digital or tape based having a storage medium capable of recording and reconstructing a theatrical perform. The term "thwarting" is used to describe any action that either detects that a recording is being made, stops the recording or renders the recording useless, or any combination thereof.

It is an aspect of the present invention to detect and locate an imaging system that is being used to surreptitiously film a theatrical event.

It is another aspect of the present invention to detect the infrared auto focus beam emitted by an imaging system being used to surreptitiously film a theatrical event.

It is yet another aspect of the present invention to detect the radio frequency signature of an imaging system being used to surreptitiously film a theatrical event.

It is still another aspect of the present invention to detect both still and video imaging systems.

It is an aspect of the present invention to thwart the recording of a theatrical event by an imaging system by interfering with the recording process or rendering the recording useless for viewing.

It is another aspect of the present invention to "blast" an image recording system when any focus beam is detected.

It is another aspect of the present invention to periodically blast the viewing area to thwart recording even when a focus beam is not detected.

It is still another aspect of the present invention to halt a theatrical experience upon detection of a focus beam.

It is a further aspect of the present invention to precisely record the focus beam in use, and characterize that beam for later forensic analysis.

These and other aspects of the present invention will become apparent from a review of the detailed description that follows.

In general terms, the system and method of the present invention detects the auto focus function of an imaging system and provides signals that thwart the recording of any images by that system. Further, the present invention does not require that an auto focus system be detected. For example, and without limitation, a thwarting signal may be continuously sent out over an audience at a theatrical event to adversely affect the functioning of an imaging system.

An embodiment of the present invention provides a system for detecting the pirating of a theatrical experience. A sensor is arranged spatially proximate to the area wherein the theatrical experience is taking place and connected to a network. The sensor is adapted to sense an auto focus emission from an imaging system and to send a signal in the event an auto focus emission is received. Altneratively, the plurality of sensor is further adapted to receive radio frequency emissions from an imaging system. In another embodiment of the present invention, the sensor adapted to receive radio frequency emissions is located in audience seating fixtures.

A processor connected to the network and adapted to receive the signal from the sensor and to initiate a warning if the signal is received. The processor comprises a computer program for determining the location of the imaging system from which the emission emanates. In an embodiment of the present invention, the area wherein the theatrical experience is taking place is a room and the sensor is located on the interior walls defining the room. In another embodiment of the present invention, the area wherein the theatrical experience is taking place is an outdoor theater and the sensor is mounted on structures arranged spatially so as to surround a space occupied by an audience.

In an embodiment of the present invention, a method of detecting the pirating of a theatrical experience is provided.

A sensor is located proximate to the area in which the theatrical experience is taking place. A sensor receives auto focus emissions from an imaging system. A processor receives the output of the sensor. If auto focus emissions from an imaging system are detected, an alarm is initiated. Optionally, the sensor receives radio frequency emissions of an imaging system. Additionally, the processor may further comprise software means for determining the location of the source of auto focus emissions received by the sensor.

In yet another embodiment of the present invention, a method of thwarting the pirating of a theatrical experience is provided. A thwarting signal generator is located proximate to the area in which the theatrical experience is taking place. A thwarting signal that is visible to an imaging system but that is not visible to the human eye is emitted. The imaging system includes a still camera, a moving picture camera, a CCD array camera, and a cellular telephone camera. In one embodiment of the present invention, the thwarting signal is in the infrared region of the spectrum. In another embodiment of the present invention, the thwarting signal is a short duration visible light signal not visible to the human eye. Alternatively, the thwarting signal is emitted from a thwarting signal generator attached to on-stage equipment. In another embodiment of the present invention, the thwarting signal is emitted from a thwarting signal generator attached to the periphery of a stage. In yet another embodiment of the present invention, the thwarting signal is emitted from a thwarting signal generator positioned behind a screen.

In another embodiment of the present invention, a method of thwarting the pirating of a theatrical experience is provided. A plurality of thwarting signal generators are located proximate to the area in which the theatrical experience is taking place. A thwarting signal that is detectable by an auto focus system of an imaging system but that is not visible to the human eye is emitted.

DETAILED DESCRIPTION OF THE INVENTION

Figure 1:
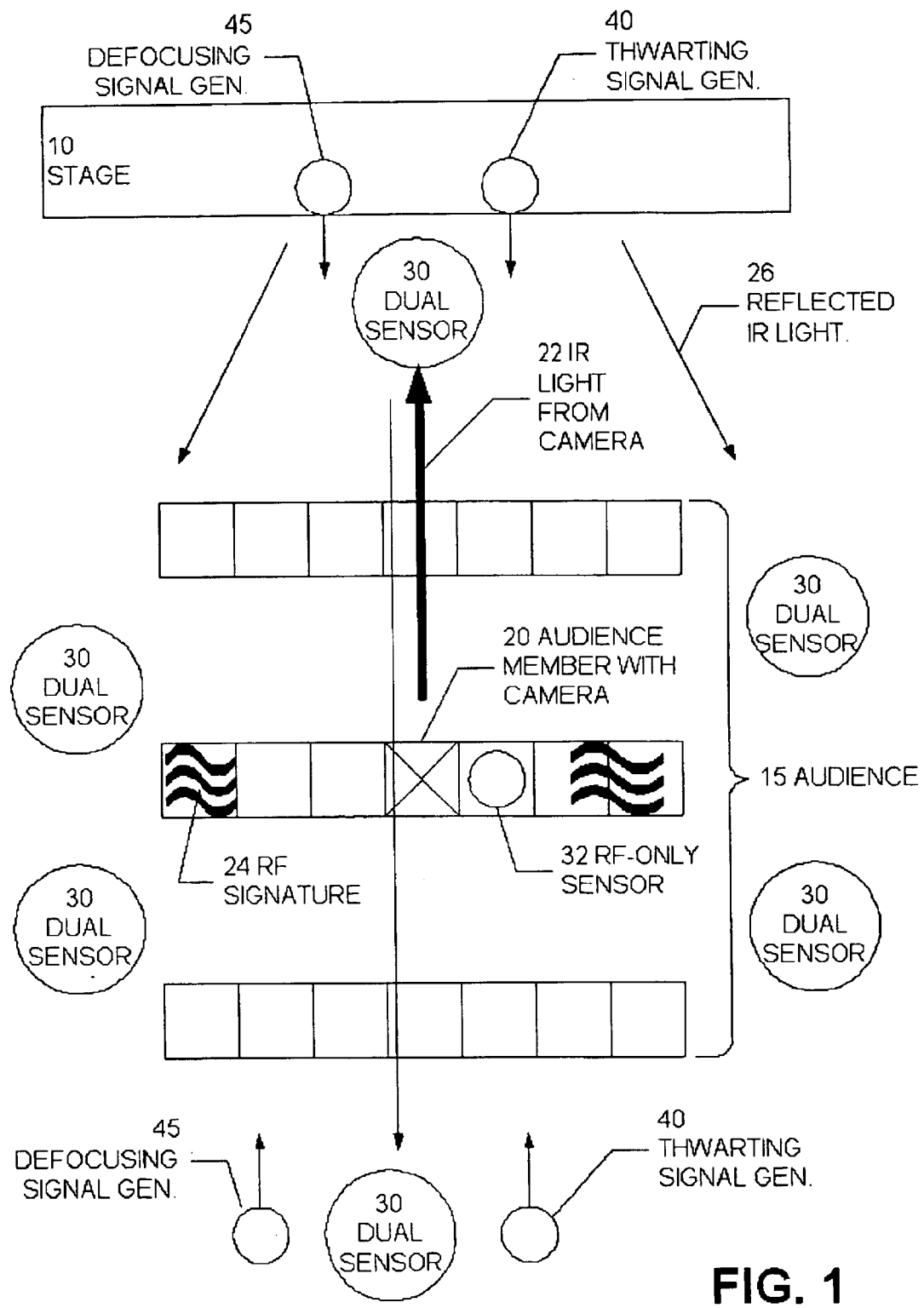
FIG. 1 illustrates a block diagram of an embodiment according to the present invention.

In one embodiment of the present invention, infrared (IR) sensors are installed on the performance area (i.e., a stage or screen) where the theatrical event is being performed and on structures to the sides and back of the performance area, and on structures above the audience. The IR sensors are sensitive to IR energy emitted by range finders (auto focus devices) used in imaging system equipment. This IR light is generally emitted by an imaging system as a main beam at a target. The target reflects the light back to the imaging system where it is received and processed to determine the distance of the target from the imaging system.

The IR light transmitters on an imaging system not only emit a main beam of IR light, but also emit less powerful side lobes that can be detected by IR sensors of the present invention located on either side of the imaging system. Alternatively, IR sensors can be placed on stage, at the back of a stage, on equipment or scenery that is on stage in order to capture the fact that the main IR beam is being used to focus on performers at a performance. In the case of a movie screen, a "pinhole" aperture in the screen may also be used with a detector behind the screen to again capture the fact that an IR beam (or other energy) is being used to focus on the screen. Such a pinhole aperture would be unseen by the audience but allow energy to be sensed.

Further, the present invention provides IR sensors located behind the imaging system for detecting the IR radiation reflected from the target. These sensors are placed in fixed locations on the back wall of the theatre, for example, or in the case of so-called "stadium" seating, on the front walls of the various tiers of the theater. Sensors in the ceiling may also be used to pick up IR scattered by the target.

Not all IR emitters emit in precisely the same way. Thus part of the present invention is to not only detect that a focusing signal is present, but to record and characterize that signal. Thus for forensic purposes, one could then later reconstruct the type of imaging system used, and potentially, even the brand of IR emitter used and even the precise emitter. Since copyright violations are criminal in nature, this information can be used for later prosecution efforts.

Some video cameras do not use IR for auto focus but rely on the incoming light for optimization of imaging being recorded. In these imaging systems, a CCD image sensor and an associated processor will sense incoming wave forms of light reflected from, for example, a screen in movie theater and will create an image as sharp as possible. Because the sharpest image possible requires the highest possible frequency, the system tries to find the highest frequency in the incoming image and adjust the position of the CCD to optimize reception of this frequency. In another embodiment of the present invention, a de-focusing signal is used to disrupt this type of auto focus system In this embodiment, the de-focusing signal is a high frequency light pulse that is emitted from a source that is in front of or behind the performance area, thereby causing the imaging system to misfocus the recorded image or to cause the imaging system to constantly change in focus point. In another embodiment, a plurality of de-focusing signals is used at various focal points to disrupt the recording process. Again, the sources for such energy can be at the periphery of a venue, on equipment that is on-stage or directly behind the performers or other locations where the energy can be aimed at an audience for image disruption purposes.

In still another embodiment of the present invention, a "thwarting signal" comprises a light source emitting energy in the light spectrum that is not visible to the human eye but which is detectable by the CCD of a digital imaging system. By way of example and not as a limitation, many CCDs used in video cameras are sensitive to IR energy. A thwarting signal comprising IR energy would be seen in a recording as a white light. Other invisible light frequencies may be combined to produce a thwarting signal of this kind. As new CCDs are developed, the thwarting signal may thus be adjusted to accommodate the spectral sensitivity of the CCD to achieve the thwarting objectives previously described. In another embodiment, the thwarting signal is projected onto a screen from a movie projector. In another embodiment, the thwarting signal is projected outward from the performance area of a live performance.

In addition, with new generations of imaging cellular telephone, the potential for a "non-focusing" system is even more present. The thwarting signals of the present invention operate to disrupt the imaging capabilities of such devices.

Because the human eye cannot detect short duration pulses of light, a thwarting signal may comprise light energy in the visible spectrum. In this embodiment, light is pulsed at high energy, but not sufficiently high to be detected by the human eye. In another embodiment, a thwarting signal comprises both light from the visible and invisible spectrum and is pulsed to thwart a recording of a theatrical event.

Referring to FIG. 1, a block diagram of embodiment according to the present invention is illustrated. A theatrical performance is performed on performance area 10 and viewed by audience 15. A member of the audience is filming the theatrical performance 20 with an imaging system (not shown). The imaging system emits both IR light 22 and an RF signature 24. Reflected IR light 26 is reflected from the focal object. Side lobes produced by the IR auto focus system of the imaging system are radiated perpendicular to the direction of the lens. Dual sensors 30 are placed at the performance area (out of view of the audience), to the sides of the audience, and at the back of the audience to receive both IR light and the RF signature of the imaging system. An RF-only sensor 32 is deployed in a seat of the audience. In a preferred embodiment, each seat would be equipped with an RF-only sensor 32.

Thwarting signal generators 40 and defocusing signal generators 45 are also illustrated.

In an embodiment of the present invention, the IR sensors are connected to a processor through a network. When the processor receives data from the IR sensors the data may be used to mathematically triangulate the approximate location of the imaging system using means known in the art.

In another embodiment of the present invention, RF detectors are used in lieu of or in addition to IR sensors. In this embodiment, the RF detectors scan the audience for an RF signature that matches a fingerprint of a digital camera. In another embodiment of the present invention, the RF detectors are used in conjunction with the IR sensors and allow the IR sensors to be focused on a suspected operating camera. Additionally, RF detectors may be installed in the audience seating fixtures.

In still another embodiment, thwarting signal generators 40 and defocusing signal generators 45 are deployed without detectors.

The system of the present invention is moveable. For example, it is envisioned that a touring theatrical event can uninstall the system at one event and transport it to the next event and install it there. Thus the producers of that theatrical event can have some assurances that protection will be afforded to the performance wherever it goes.

A system and method of detecting and thwarting the use of unauthorized imaging systems at theatrical performances has now been illustrated. It will be understood by those skilled in the art of the present invention that the systems and methods of the present invention can be used with or without detecting a focusing signal. Thus the invention will be useful in providing periodic "blasts" of energy to thwart the recording of a theatrical event even when detection of a focusing signal has not occurred. Further, although the claims herein discuss a single sensor or thwarting signal generator, this is not meant as a limitation. The present invention anticipates that multiple sensors and thwarting signal generators are to be used in preferred embodiments, the number and strength of which will vary depending on the size and shape of the venue in which the theatrical experience is taking place. Additionally, the systems and methods may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A system for detecting the pirating of a theatrical experience comprising:

a sensor arranged spatially proximate to an area wherein the theatrical experience is taking place and connected to a network;

the sensor adapted to sense an auto focus emission from an imaging system and to send a sensor signal in the event an auto focus emission is received;

a thwarting signal generator connected to the network, and wherein the thwarting signal generator is adapted to automatically generate a thwarting signal; and a processor connected to the network and adapted to receive the sensor signal from the sensor and to instruct the thwarting signal generator to emit the thwarting signal if the sensor signal is received.

2. The system of claim 1 wherein the area wherein the theatrical experience is taking place is a room and the sensor is located on the interior walls defining the room.

3. The system of claim 1 wherein the area wherein the theatrical experience is taking place is an outdoor theater and the sensor is mounted on structures arranged spatially so as to surround a space occupied by an audience.

4. The system of claim 1 wherein the processor comprises a computer program for determining the location of the imaging system from which the emission emanates.

5. The system of claim 1 wherein the plurality of sensors is further adapted to receive radio frequency emissions from the imaging system.

6. The system of claim 5 wherein the sensor adapted to receive radio frequency emissions is located in audience seating fixtures.

7. A method of detecting the pirating of a theatrical experience comprising a sensor located proximate to an area in which the theatrical experience is taking place, the method comprising:

receiving at the sensor auto focus emissions from an imaging system; and receiving at a processor the sensor signal, wherein the processor is adapted to instruct a thwarting signal generator to emit a thwarting signal if the sensor signal is received.

8. The method as in claim 7 further comprising receiving at the sensor radio frequency emissions of the imaging system.

9. The method as in claim 7 wherein the method further comprises determining the location of the source of the auto focus emissions received by the sensor.

* * * * *